(12) United States Patent
Gerken et al.

(10) Patent No.: US 6,381,123 B1
(45) Date of Patent: Apr. 30, 2002

(54) MULTIPLE POLES OF SUB-FEED IN LIGHTING PANEL

(75) Inventors: Michael T. Gerken, West Hartford; Dennis C. Zuffelato, Kensington, both of CT (US); Ramesh Babu, Hyderabad (IN); Daniel Schlitz, Burlington; Joseph F. Noonan, Bolton, both of CT (US); Robert A. Wall, Jr., Salisbury, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/510,858

(22) Filed: Feb. 23, 2000

(51) Int. Cl.[7] .................................................. H02B 1/20
(52) U.S. Cl. ......................................................... 361/652
(58) Field of Search ................................. 361/652, 650, 361/673, 634

(56) References Cited

U.S. PATENT DOCUMENTS

| | | | | |
|---|---|---|---|---|
| 2,632,039 A | * | 3/1953 | Hammerly et al. | 361/652 |
| 3,192,446 A | * | 6/1965 | Meecham | 361/652 |
| 3,267,336 A | * | 8/1966 | Kussy | 361/652 |
| 3,590,332 A | * | 6/1971 | Anderson et al. | 361/650 |
| 4,205,892 A | * | 6/1980 | Clement et al. | 361/652 |
| 4,472,761 A | * | 9/1984 | Koslosky et al. | 361/673 |
| 4,783,718 A | * | 11/1988 | Raabe et al. | 361/652 |

* cited by examiner

Primary Examiner—Neil Abrams
(74) Attorney, Agent, or Firm—Cantor Colburn LLP

(57) ABSTRACT

A multiple pole sub-feed for a panel board is disclosed. The sub-feed of the present invention includes extension bus bars which connect to the bus bars of the panel board and preferably linearly extend the length of the sub-feed. The sub-feed further includes bus connectors supported generally perpendicular to the extension bus bars and preferably extending the width of the sub-feed. The design allows for a plurality of poles of sub-feed to be accommodated by adding bus connectors to the end of the sub-feed, where each bus connector includes an opening for electrically connecting to one of the extension bus bars. Current passes from the extension bus bars to a metal retainer connecting the bus connector to the extension bus bars, to a current carrying strap in the bus connectors, to a current carrying spool located in a turret on the bus connectors, and then to a circuit breaker positioned above the bus connector about the turret.

20 Claims, 2 Drawing Sheets

MULTIPLE POLES OF SUB-FEED IN LIGHTING PANEL

BACKGROUND OF THE INVENTION

The present invention relates to a lighting panel or panel board, and more particularly relates to poles of sub-feed for a panel board.

Panel boards, which are commonly employed in light industrial applications, such as small factories and strip malls, are often utilized to control the building's lighting systems. Thus, these panel boards are often called "lighting panels" even though their applications may extend beyond the control of lighting systems. In use, lighting panels are most often found within a closed door enclosure such as an electrical box in an area accessible to electricians or other end-users. Also, lighting panels today are generally limited to three poles of sub-feed.

Typically, when an electrician needs to install a lighting panel, the electrician or contractor can place an order with a manufacturer by detailing his or her needs to the manufacturer. The requested lighting panel is then factory assembled according to the order and usually delivered within ten or so days. If not planned properly, such a delay can sometimes cause problems with an expected completion time for a job.

One manufacturer has designed a kit for allowing 6 poles of sub-feed in a lighting panel which basically uses two separate, but different, 3-poles kits. The first three pole kit attaches directly to the bus bars extending from the branch of the lighting panel. The second three pole kit, however, must utilize an additional set of extension bus bars which pass underneath the bus bars for the first three poles. This design makes the six pole sub-feed use more isolating plastic and other parts, thus making this system relatively expensive.

SUMMARY OF THE INVENTION

In an exemplary embodiment of the invention, a sub-feed for a panel board has a first end, a second end opposite the first end, a first side, a second side opposite the first side, and a central portion intermediate the first side and the second side. The sub-feed further comprises a first extension bus bar adjacent the first side of the sub-feed, a second extension bus bar located in the central portion of the sub-feed, and a third extension bus bar adjacent the second side of the sub-feed. Each extension bus bar extends from the first end to the second end of the sub-feed. A first bus connector having a first opening is aligned above the first extension bus bar, a second bus connector having a second opening is aligned above the second extension bus bar, a third bus connector having a third opening is aligned above the third extension bus bar, a fourth bus connector having a fourth opening is aligned above the first extension bus bar, a fifth bus connector having a fifth opening is aligned above the second extension bus bar, and a sixth bus connector having a sixth opening is aligned above the third extension bus bar.

DETAILED DESCRIPTION OF THE PREFERRED EMBODIMENTS

Figure 1:
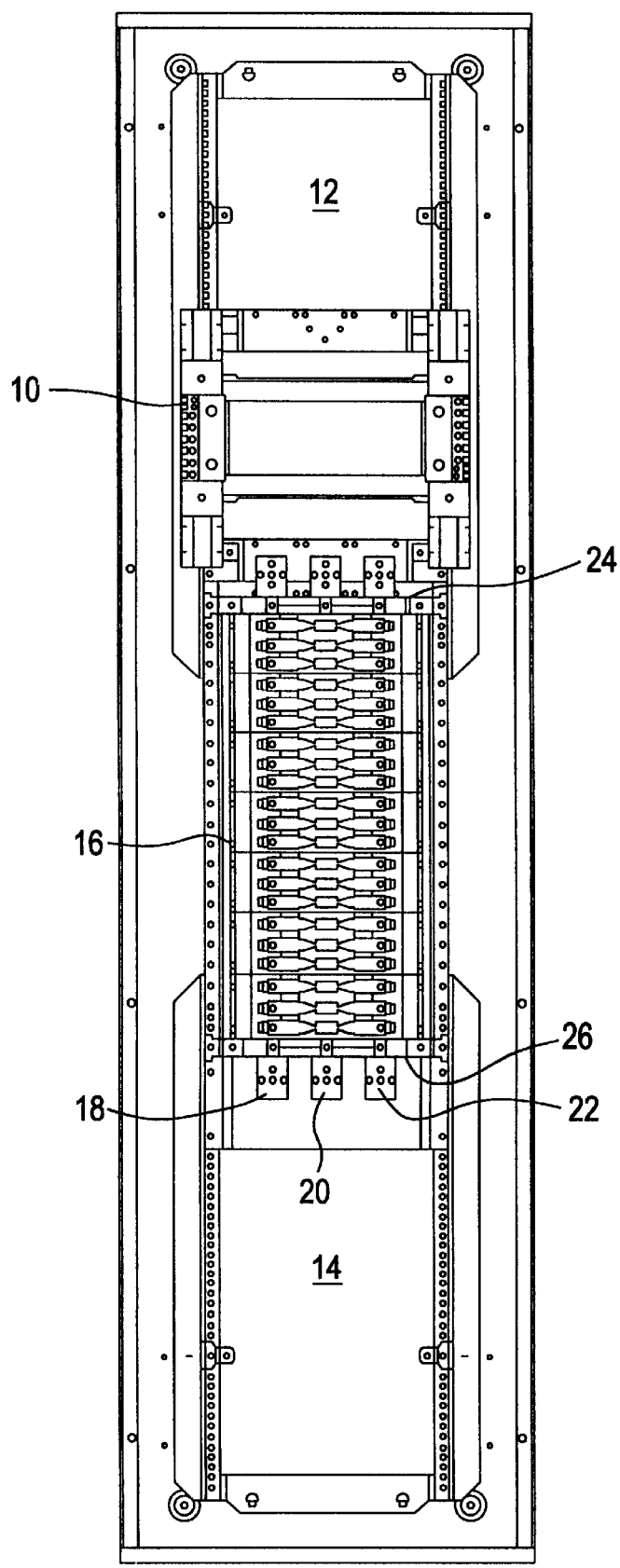
FIG. 1 shows a top plan view of a panel board of the present invention.

A panel board 10 is shown in FIG. 1 with a space 12 for a main lug or main breaker (not shown) and a space 14 for sub-feed breaker or lugs (not shown). The panel board 10 further comprises a branch 16 having a top end 24 below the space 12 and a bottom end 26 above the space 14. The branch 16 may include any number of circuits, forty-two shown in FIG. 1, for supporting circuit breakers (not shown) which would be the last circuit breakers in the electrical path before an application (such as a light). The panel board 10 further supports three bus bars 18, 20, 22 which extend into spaces 12 and 14 for connection with the main breaker and sub-feed breaker(s). Thus, as shown, the panel board 10 is a three phase, 42 circuit interior with sub-feed panel board. The panel board 10 may be placed singularly or with other similar panel boards within an electrical box or other suitable enclosure, typically having a door, for access by an electrician or end-user.

Figure 2:
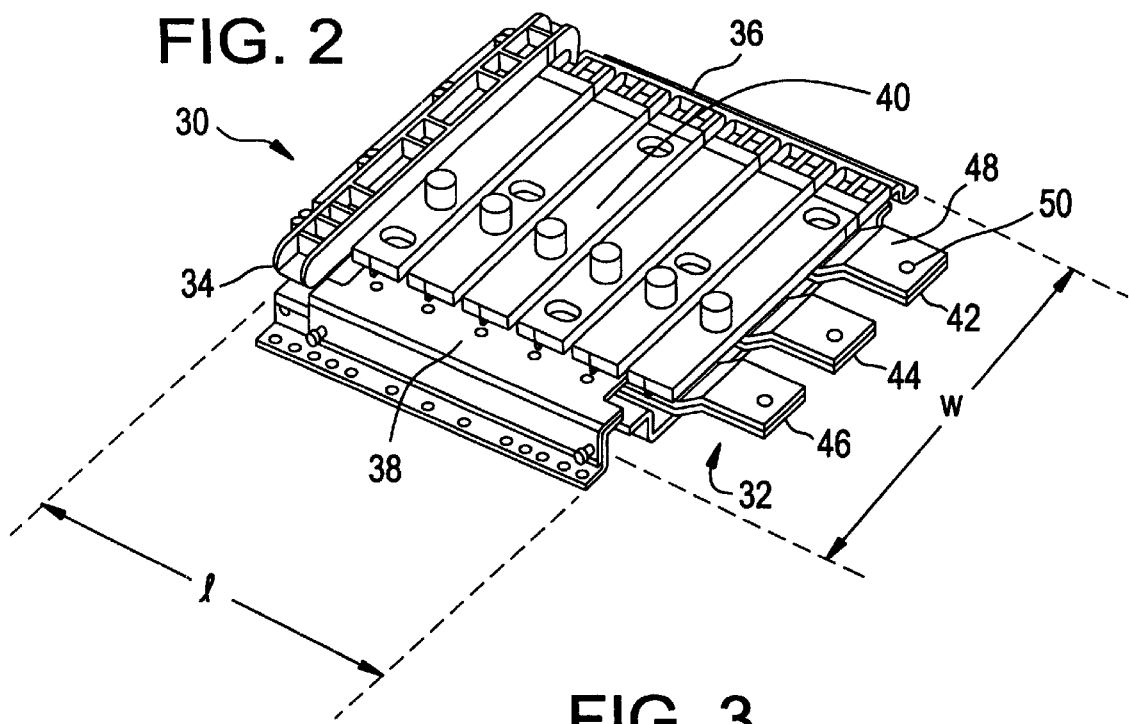
FIG. 2 shows a top perspective view of a multiple pole sub-feed of the present invention; and, FIG. 3 shows an exploded perspective view of the multiple pole sub-feed of FIG. 2.
Figure 3:
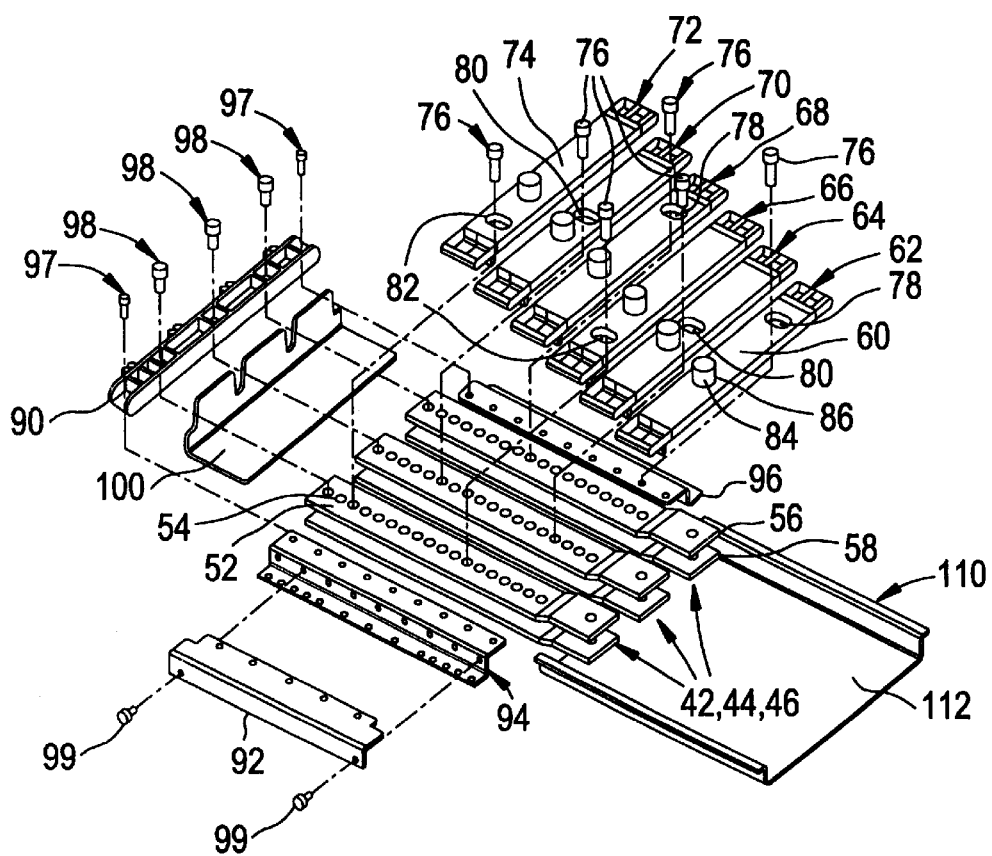

The multiple pole sub-feed 30 to be fitted into space 14 of the present invention is shown in FIGS. 2 and 3. The sub-feed 30 has a first end 32, a second end 34, a first side 36, a second side 38, and a central portion 40 between the first and second sides 36, 38. The sub-feed 30 further includes three extension bus bars 42, 44, 46 each having a connection end 48 with an aperture 50 for connecting the extension bus bars 42, 44, 46 to the bus bars 18, 20, 22 on the panel board 10. A first extension bus bar 42 is adjacent the first side 36 of the sub-feed 30, a second extension bus bar 44 is located in the central portion 40 of the sub-feed, and a third extension bus bar 46 is adjacent the second side 38 of the sub-feed 30. Each extension bus bar 42, 44, 46 extends generally linearly and almost the entire length l of the sub-feed by extending from the connection end 48 adjacent the first end 32 of the sub-feed 30 to a point adjacent the second end 34 of the sub-feed 30, such that each extension bus bar 42, 44, 46 occupies a discrete portion of the width w. The connection ends 48 of the extension bus bars 42, 44, 46 are shown as rectangular flanges offset from the platform bases 52 of the extension bus bars 42, 44, 46. The connection ends or flanges 48 are offset so that they may overlap the bus bars 18, 20, 22 on the panel board 10 with a bolt or suitable retainer (not shown) passing through the apertures 50 and into a matching aperture in the bus bars 18, 20, 22. Although offset, the flanges 48 and the platform bases 52 preferably lie in parallel planes. The platform bases 52 are preferably provided with a plurality of apertures 54 for mechanical and electrical connections as will be described. As shown, each extension bus bar 42, 44, 46 is provided with two layers 56, 58 for carrying the required current and meeting electrical guidelines. Alternatively, the thickness of the extension bus bars 42, 44, 46 could be increased to eliminate the need for overlapping layers 56, 58 so long as the current carrying requirement is met. Preferably, the extension bus bars 42, 44, 46 are made of copper, although other current carrying materials are within the scope of this invention.

Supported above the extension bus bars 42, 44, 46 are a plurality of bus connectors 60 preferably extending generally perpendicularly to the extension bus bars 42, 44, 46. Each bus connector 62, 64, 66, 68, 70, and 72 preferably extends nearly the width w of the sub-feed 10 and occupies a discrete portion of the length l. Each bus connector 62, 64, 66, 68, 70, and 72 includes a current carrying strap (e.g. a copper strap), not shown, surrounded by an electrical insulating layer 74, such as plastic. Electrical connection between the current carrying strap and an extension bus bar 42, 44, or 46 is completed by passing a metal screw or other current carrying retainer 76 through an opening 78, 80, or 82 in the bus connector 60. One pole of a multiple pole circuit breaker can connect to one bus connector 60 by being supported on a connection point or turret 84. Each turret 84 preferably includes an electrical insulating layer 86, extending from the electrical insulating layer 74 of the bus connector 60, and an internal electrical conducting material (not shown), such as a spool of copper, connecting with the current carrying strap.

The openings 78, 80, 82 in the bus connectors 60 are staggered such that connection to the extension bus bars 42, 44, 46 is alternated between the three phases. That is, a first bus connector 62 has a first opening 78 aligned with the first extension bus bar 42, a second bus connector 64 has a second opening 80 aligned with the second extension bus bar 44, and a third bus connector 66 has a third opening 82 aligned with the third extension bus bar 46. If the sub-feed 30 was limited to three poles, then each phase would be adequately utilized. For additional connection points, a fourth bus connector 68 is provided with a fourth opening 78 in the sub-feed 30 which is aligned with the first extension bus bar 42, a fifth bus connector 70 is provided with a fifth opening 80 aligned with the second extension bus bar 44, and a sixth bus connector 72 is provided with a sixth opening 82 aligned with the third extension bus bar 46. Thus, the first and fourth bus connectors 62, 68 may be identical, the second and fifth bus connectors 64, 70 may be identical, and the third and sixth bus connectors 66, 72 may be identical. As shown, the turrets 84 are located in the same position in each bus connector 60 such that the circuit breakers can be placed in any desired location on the sub-feed 30.

The sub-feed 30 further includes a bus support 90 as well as side supports 92, 94, 96 for providing mechanical connection of the components of the sub-feed 30. Each bus connector 60 extends from a first side support 96 located on the first side 36 of the sub-feed 30 to a second side support 94 located on the second side 38 of the sub-feed 30. The bus support 90 is positioned on the second end 34 of the sub-feed 30. A phase to ground barrier 100 provides electrical isolation to prevent arcing between the phases. The phase to ground barrier 100 may be a right angled shield extending the width w of the sub-feed 30 (generally the width of a bus connector 60) and positioned at the second end 34 of the sub-feed 30 between the bus support 90 and the last bus connector 72. A ground barrier 110 provides electrical isolation to prevent phases from arcing to ground. The ground barrier 110 may be a shallow U-shaped shield doubling as a base for the sub-feed 30 and having a lower planar base 112 extending generally the width w and length l of the sub-feed 30. Retainers 97, 98, 99, which may include screws and bolts, pass through the bus support 90, side supports 92, 94, 96, and extension bus bars 42, 44, 46 for retaining the components of the sub-feed 30 together.

Referring to FIGS. 1, 2, and 3, in use, the extension bus bars 42, 44, 46 of the sub-feed 30 are connected to the bus bars 18, 20, 22 on the panel board 10. The remainder of the sub-feed 30 is positioned within the space 14 of the panel board 10. As needed, circuit breakers are attached to the turrets 84 of the sub-feed 30. Usually, multiple pole circuit breakers are employed in which case one circuit breaker would cover more than one bus connector 60. For example, three dual-pole circuit breakers or two tri-pole circuit breakers could be attached to the sub-feed 30. In any event, current would pass from a bus bar 18, 20, 22 to an extension bus bar 42, 44, 46, then to a retainer 76, to a current carrying strap within a bus connector 60, to a copper spool within a turret 84, and then to a circuit breaker (not shown).

The present invention allows for multiple poles of sub-feed than has previously been economically desirable. The design of the present invention further allows for the expansion of the sub-feed 30 using the same concept. That is, nine, twelve, or more poles of sub-feed could be employed by simply adding bus connectors 60 as needed and lengthening the side supports 92, 94, 96, ground barrier 110, and extension bus bars 42, 44, 46 to accommodate the additional bus connectors 60. Furthermore, because the same extension bus bars 42, 44, 46 are used for any number of multiple poles of sub-feed, the thickness of the extension bus bars 42, 44, 46 could be varied. That is, as bus current is removed by upstream breakers, the extension bus bars 42, 44, 46 underneath the downstream bus connectors 60 could be thinner saving on copper or other current carrying material. Alternatively, a plurality of 3-pole sub-feeds using the design of the present invention could be linked or chained together, using a final bus support 90 and phase to ground barrier 100 at the end of the chain.

Preferably, the extension bus bars 42, 44, 46 of the present invention resemble the bus structure of the branch 16. This allows the use of the same style of bus connectors 60 and bus supports 90 (both injection molded parts) on the sub-feed 30 that are used on the branch 16.

The present invention thus provides for a "merchandisable" system in which the base parts (panel boards 10, electrical boxes, etc.) and sub-feed kits (3-pole sub-feeds, 6-pole sub-feeds), could be stocked by a distributor or wholesaler. Thus, an electrician or contractor could pick up the desired interior and kits without having to factory order the parts.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A panelboard comprising:
   a branch having a plurality of circuits for supporting a plurality of branch circuit breakers, the branch having a top end and a bottom end;
   first, second, and third generally parallel panelboard bus bars passing through the branch;
   a first space for supporting a main breaker positioned above the top end of the branch, the panelboard bus bars extending into the first space;
   a second space for supporting a sub-feed positioned below the bottom end of the branch, the panelboard bus bars extending into the second space;
   a multiple pole sub-feed positioned in the second space, the sub-feed having a length and a width, the sub-feed having first, second, and third generally parallel extension bus bars extending the length of the sub-feed, a portion of the extension bus bars overlapping a portion of the panelboard bus bars, the sub-feed further having a plurality of bus connectors extending the width of the sub-feed and generally perpendicular to the extension bus bars, wherein each bus connector is provided with an opening aligned with one of the extension bus bars wherein each pole of a sub-feed breaker attached to the multiple pole sub-feed is electrically connectable to an extension bus bar through each opening of each bus connector.

2. The panelboard of claim 1 wherein the first extension bus bar is connected to the first panelboard bus bar, the second extension bus bar is connected to the second panelboard bus bar, and the third extension bus bar is connected to the third panelboard bus bar.

3. The panelboard of claim 1 comprising six bus connectors in the sub-feed, a first bus connector having a first opening aligned with the first extension bus bar, a second bus connector having a second opening aligned with the second extension bus bar, a third bus connector having a third opening aligned with the third extension bus bar, a fourth bus connector having a fourth opening aligned with the first extension bus bar, a fifth bus connector having a fifth opening aligned with the second extension bus bar, and a sixth bus connector having a sixth opening aligned with the third extension bus bar.

4. The panelboard of claim 1 further comprising a metal retainer passing through each opening in the bus connectors and electrically connecting the extension bus bars with the bus connectors.

5. The panelboard of claim 1 further comprising a turret on each bus connector, the turret adapted to electrically connect each bus connector with a sub-feed circuit breaker.

6. The panelboard of claim 1 wherein the sub-feed further comprises a ground barrier having a lower plate positioned between the second space and the extension bus bars, the ground barrier generally extending the width and length of the sub-feed.

7. The panelboard of claim 1 wherein the sub-feed further comprises a phase to ground barrier having a right-angled shield positioned at an end of the sub-feed.

8. The panelboard of claim 1 wherein the sub-feed includes a first end and a second end opposite the first end, each extension bus bar extending generally from the first end to the second end of the sub-feed, and further wherein each extension bus bar has a first thickness adjacent the first end of the sub-feed and a second thickness adjacent the second end of the sub-feed, the first thickness being greater than the second thickness.

9. The panelboard of claim 8 wherein the first end of the sub-feed is connected to the bottom end of the branch.

10. A panelboard system comprising:
an electrical enclosure; and,
at least one panelboard, the at least one panelboard including a branch having a plurality of circuits for supporting a plurality of branch circuit breakers, the branch having a top end and a bottom end;
first, second, and third generally parallel panelboard bus bars passing through the branch;
a first space for supporting a main breaker positioned above the top end of the branch, the panelboard bus bars extending into the first space;
a second space for supporting a sub-feed positioned below the bottom end of the branch, the panelboard bus bars extending into the second space;
a multiple pole sub-feed positioned in the second space, the sub-feed having a length and a width, the sub-feed having first, second, and third generally parallel extension bus bars extending the length of the sub-feed, a portion of the extension bus bars overlapping a portion of the panelboard bus bars, the sub-feed further having a plurality of bus connectors extending the width of the sub-feed and generally perpendicular to the extension bus bars, wherein each bus connector is provided with an opening aligned with one of the extension bus bars wherein each pole of a sub-feed breaker attached to the multiple pole sub-feed is electrically connectable to an extension bus bar through each opening of each bus connector.

11. The panelboard system of claim 10 wherein the electrical enclosure is a box.

12. The panelboard system of claim 11 wherein the box includes a door.

13. The panelboard system of claim 10 including a plurality of panelboards.

14. The panelboard system of claim 10 including a main breaker supported within the first space, a plurality of branch circuit breakers supported on the branch, and at least one sub-feed breaker supported on the multiple pole sub-feed.

15. The panelboard system of claim 10 wherein the sub-feed of each of the at least one panelboard includes a first end and a second end opposite the first end, each extension bus bar extending generally from the first end to the second end of the sub-feed, and further wherein each extension bus bar has a first thickness adjacent the first end of the sub-feed and a second thickness adjacent the second end of the sub-feed, the first thickness being greater than the second thickness.

16. The panelboard system of claim 15 wherein the first end of the sub-feed of each of the at least one panelboard is connected to the bottom end of the branch of each of the least one panelboard.

17. The panelboard system of claim 10 wherein, within each of the at least one panelboard, the first extension bus bar is connected to the first panelboard bus bar, the second extension bus bar is connected to the second panelboard bus bar, and the third extension bus bar is connected to the third panelboard bus bar.

18. The panelboard system of claim 10 wherein each of the at least one panelboard comprises six bus connectors in the sub-feed, a first bus connector having a first opening aligned with the first extension bus bar, a second bus connector having a second opening aligned with the second extension bus bar, a third bus connector having a third opening aligned with the third extension bus bar, a fourth bus connector having a fourth opening aligned with the first extension bus bar, a fifth bus connector having a fifth opening aligned with the second extension bus bar, and a sixth bus connector having a sixth opening aligned with the third extension bus bar.

19. The panelboard system of claim 10 wherein each of the at least one panelboard further comprises a metal retainer passing through each opening in the bus connectors and electrically connecting the extension bus bars with the bus connectors.

20. The panelboard system of claim 10 wherein each of the at least one panelboard further comprises a turret on each bus connector, the turret adapted to electrically connect each bus connector with a sub-feed circuit breaker.

* * * * *